US010516183B2

(12) United States Patent
Marchal

(10) Patent No.: US 10,516,183 B2
(45) Date of Patent: Dec. 24, 2019

(54) ELECTROCHEMICAL CELL STACK

(71) Applicant: ITM POWER (RESEARCH) LIMITED, Sheffield, South Yorkshire (GB)

(72) Inventor: Frederic Andre Marchal, South Yorkshire (GB)

(73) Assignee: ITM POWER (RESEARCH) LIMITED, Sheffield, South Yorkshire (GB)

( * ) Notice: Subject to any disclaimer, the term of this patent is extended or adjusted under 35 U.S.C. 154(b) by 21 days.

(21) Appl. No.: 16/009,269

(22) Filed: Jun. 15, 2018

(65) Prior Publication Data

US 2019/0020050 A1  Jan. 17, 2019

Related U.S. Application Data

(63) Continuation of application No. 13/641,285, filed as application No. PCT/GB2011/050759 on Apr. 18, 2011, now Pat. No. 10,026,987.

(30) Foreign Application Priority Data

Apr. 16, 2010  (GB) .................................. 1006403.8

(51) Int. Cl.
*H01M 8/24* (2016.01)
*H01M 8/248* (2016.01)
(Continued)

(52) U.S. Cl.
CPC ........... *H01M 8/248* (2013.01); *H01M 8/242* (2013.01); *H01M 8/2483* (2016.02)

(58) Field of Classification Search
None
See application file for complete search history.

(56) References Cited

U.S. PATENT DOCUMENTS 4,056,042 A * 11/1977 Rutz .................... F04B 49/128
91/497
4,202,772 A   5/1980 Goldstein
(Continued)

FOREIGN PATENT DOCUMENTS

GB   2460928     12/2009
JP   2000-348753 12/2000
(Continued)

OTHER PUBLICATIONS

Development of Fuel Cell and Materials Thereof, CMC Publishing CO., LTD., 2002, p. 91.

*Primary Examiner* — Scott J. Chmielecki
(74) *Attorney, Agent, or Firm* — Saliwanchik, Lloyd & Eisenschenk

(57) ABSTRACT

A cell stack comprising an electrochemical cell, or a plurality of axially arranged electrochemical cells, with an end plate at each end of the stack, each cell comprising an active area surrounded by a peripheral area, wherein the active area comprises the membrane electrode assembly, and the peripheral area includes one or more channels for reactants, and wherein the stack comprises means for applying pressure axially to the active area to contact the membrane and electrodes, and separate means for applying pressure axially to the peripheral area. Further, a method of performing an electrochemical reaction in a cell comprising an active area surrounded by a peripheral area, comprises applying pressure to the active area, and varying the pressure during operation of the cell, wherein the active area includes the membrane electrode assembly and is the area where the cell reaction occurs.

11 Claims, 6 Drawing Sheets

(51) Int. Cl.
*H01M 8/242* (2016.01)
*H01M 8/2483* (2016.01)

(56) References Cited

U.S. PATENT DOCUMENTS

| | | | | |
|---|---|---|---|---|
| 6,720,101 B1* | 4/2004 | Dong | ............... | H01M 8/2475 |
| | | | | 429/435 |
| 2005/0026024 A1 | 2/2005 | Ohara et al. | | |
| 2006/0134499 A1* | 6/2006 | Homma | ............... | H01M 8/2475 |
| | | | | 429/423 |
| 2007/0015039 A1* | 1/2007 | Homma | ............... | H01M 8/004 |
| | | | | 429/457 |
| 2008/0042488 A1* | 2/2008 | Anderson | ............... | B60T 8/323 |
| | | | | 303/10 |
| 2008/0083614 A1* | 4/2008 | Swalla | ............... | C25B 9/20 |
| | | | | 204/242 |
| 2008/0152989 A1* | 6/2008 | Yeh | ............... | H01M 8/247 |
| | | | | 429/470 |
| 2008/0234101 A1* | 9/2008 | Suzuki | ............... | F16D 48/02 |
| | | | | 477/97 |
| 2009/0130512 A1* | 5/2009 | Eshraghi | ............... | H01M 8/004 |
| | | | | 429/437 |
| 2009/0246586 A1* | 10/2009 | Kawabata | ............... | H01M 4/886 |
| | | | | 429/483 |
| 2009/0280944 A1* | 11/2009 | Hiraoka | ............... | F16H 37/042 |
| | | | | 475/116 |
| 2009/0305104 A1 | 12/2009 | Matsumoto et al. | | |
| 2010/0000210 A1* | 1/2010 | Mueller | ............... | B60K 6/12 |
| | | | | 60/414 |
| 2010/0068585 A1* | 3/2010 | Hoppes | ............... | H01M 8/0273 |
| | | | | 429/498 |
| 2010/0069193 A1* | 3/2010 | Mueller | ............... | B60K 6/12 |
| | | | | 475/78 |
| 2010/0092824 A1* | 4/2010 | Ogawa | ............... | H01M 8/028 |
| | | | | 429/458 |
| 2010/0099003 A1* | 4/2010 | Ogawa | ............... | H01M 8/0228 |
| | | | | 429/458 |
| 2010/0209799 A1* | 8/2010 | Ogawa | ............... | H01M 8/0204 |
| | | | | 429/457 |
| 2010/0297521 A1* | 11/2010 | Ogawa | ............... | H01M 8/0247 |
| | | | | 429/456 |
| 2011/0039182 A1* | 2/2011 | Dan | ............... | H01M 8/0247 |
| | | | | 429/456 |
| 2011/0189576 A1* | 8/2011 | Saito | ............... | H01M 8/0204 |
| | | | | 429/455 |
| 2011/0302913 A1* | 12/2011 | Mueller | ............... | B60K 6/12 |
| | | | | 60/413 |
| 2012/0009498 A1* | 1/2012 | Ogawa | ............... | H01M 8/0247 |
| | | | | 429/455 |
| 2012/0045702 A1* | 2/2012 | Takahashi | ............... | H01M 8/1213 |
| | | | | 429/423 |
| 2012/0045708 A1* | 2/2012 | Nango | ............... | H01M 8/0202 |
| | | | | 429/457 |

FOREIGN PATENT DOCUMENTS

| | | |
|---|---|---|
| JP | 2002-117889 | 4/2002 |
| JP | 2002-302785 | 10/2002 |
| JP | 2004-253269 | 9/2004 |
| JP | 2005-71989 | 3/2005 |
| JP | 2006-179402 | 7/2006 |
| JP | 2008-103211 | 5/2008 |
| JP | 2008-186736 | 8/2008 |
| JP | 2008-257889 | 10/2008 |
| WO | 95/028010 | 10/1995 |
| WO | 02/09216 | 1/2002 |
| WO | WO 2008/149554 | 11/2008 |
| WO | 2010119817 | 10/2010 |

* cited by examiner

ELECTROCHEMICAL CELL STACK

CROSS-REFERENCE TO RELATED APPLICATIONS

The present application is a continuation application of U.S. application Ser. No. 13/641,285, filed Oct. 15, 2012, which is a national stage application of International Application No. PCT/GB2011/050759, filed Apr. 18, 2011, which claims priority to Great Britain Application No. 1006403.8, filed Apr. 16, 2010, the disclosures of which are incorporated herein by reference in their entirety, including any figures, tables, and drawings.

FIELD OF THE INVENTION

The present invention relates to a stack arrangement for electrochemical cells.

BACKGROUND

In conventional stacks of electrochemical cells, the cells comprise a membrane electrode assembly sandwiched between bipolar plates. The plates usually act as the current collector and the electrode or 'packing structures' constitute the flow fields. It is necessary that the different elements of the cell are held together in the stack, and that pressure is applied. This is conventionally achieved by the use of tie rods around the periphery of the cell, arranged axially.

When the cell is sealed by the use of tie rods, it can sometimes be difficult to ensure that uniform pressure is applied to the whole active area (i.e. the membrane electrode assembly) of the cell. Another problem with this arrangement is that, while there is a good degree of pressure around the periphery of the cell, the centre of the cell, i.e. where the tie rods are not positioned, can sometimes bend outwards and lose pressure. Also, when the cells need to be serviced, the process of removing tie rods and numerous spring loading component is laborious.

Sometimes elastomeric elements are found compressed between the end plate and the cells at each extremity. The uniformity of pressure is better addressed by this type of cell but it is a permanent pressure that is applied. This is inflexible and uncontrollable other than by replacing of the part or member. This is a problem because the contact magnitude is central to ohmic losses between adjacent components, and therefore the overall efficiency.

BRIEF SUMMARY

It has been found to be advantageous to separate the active area of the cell from the area that forms the seal and that delivers reactants. Both these areas need to be pressurised and it has also been found to be advantageous to pressurise them separately. This results in a uniform active area pressure, which can be fine-tuned independently from the sealing force. Therefore, according to a first aspect, a cell stack comprises an electrochemical cell, or a plurality of axially arranged electrochemical cells, with an end plate at each end of the stack, each cell comprising an active area surrounded by a peripheral area, wherein the active area comprises the membrane electrode assembly, and the peripheral area includes a channel for reactants, and wherein the stack comprises means for applying pressure axially to the active area to contact the membrane and electrodes, and separate means for applying pressure axially to the peripheral area.

According to a second aspect, a method of performing an electrochemical reaction in a cell comprising an active area surrounded by a peripheral area, comprises applying pressure to the active area, and varying the pressure during generation of the cell, wherein the active area includes the membrane electrode assembly and is the area where the cell reaction occurs.

DETAILED DESCRIPTION

As used herein, the term electrochemical cell comprises both electrolysers and fuel cells. The invention is equally applicable to both.

In one embodiment, each cell structure comprises a conductive disc (bipolar plate), which is preferably two-dimensional and of an appropriately deformable thickness. Preferably, the disc includes a plurality of manifolds (channels for reactants) cut into the periphery. The conductive disc has an outer region, which forms part of the peripheral area of the stack, and an inner region, which forms part of the active area of the stack.

In a preferred embodiment, a cell of the invention comprises a gasket, which is hollow, and which preferably has the same arrangement of manifolds cut out of the structure. Preferably, the gasket is thermoplastic, elastomeric, polymeric or ceramic. The assembly conditions for the gasket are well known to a person skilled in the art.

In a preferred embodiment, a cell of the invention comprises a hollow peripheral plate. It may be a metal or non-metal. In one embodiment, it is polymeric. However, a metallic peripheral plate is preferred in a high pressure cell. Preferably, the frame ring is substantially two-dimensional, i.e. it is very thin and flat. It may have a textured or non-textured face. Preferably, it also comprises a plurality of manifolds.

As will be evident from the drawings, the electrochemical cell stack is formed of a axial arrangement of the individual components. In a preferred embodiment, the stack is substantially tubular.

The channels or manifolds are the means for routing products and reactants in and out of the cell. In one embodiment, the manifolds of the peripheral plate will be cross-drilled with at least one hole, which routes the flow of reactant products between the membrane electrode assembly and the manifolds. In another embodiment, a complete portion of the peripheral plate will be removed for much greater opening between the membrane electrode assembly and the manifold. Preferably, the opening will then be filled by a porous structure, allowing a highly customisable flow configuration. This embodiment is illustrated in FIG. 5.

In another embodiment, no cross-drilling is necessary and instead an engraving method is used, whereby the surface of the peripheral plate(s) are indented so that fluid can pass from the manifolds to the active area. This can also be achieved by replacing one peripheral plate by two separate peripheral plates, mated, and having at least one groove machined on the mating face, to allow reactants to pass to the active area. A gasket should be sandwiched between the two mating faces, to allow passage of fluid where a grove is provided, and to ensure that the other manifolds are sealed.

In a preferred embodiment, the membrane is a polymer membrane. Preferably, it is a hydrophilic polymer membrane. Most preferably, it is formed by the co-polymerisation of a hydrophilic monomer, a hydrophobic monomer, a monomer comprising a strongly ionic group and water. Preferably, the polymer is cross-linked.

A stack of electrochemical cells according to the present invention is sealed between two end plates. In one embodiment, external pressure is applied directly to the active area of the cell only, i.e. the centre of the axial arrangement. In this embodiment, no external pressure is applied to the peripheral area of the stack, i.e. the outer portion of the axial arrangement. The pressure is applied in an axial fashion.

In a preferred embodiment, the means for applying pressure to the active area is adjustable, such that the degree of pressure can be controlled/varied, according to the requirements of the cell.

Preferably, the means for applying pressure to the active area is a piston preferably a hydrostatic piston or a hydraulic pump. However, there are other suitable means for applying pressure, and these will be known to those skilled in the art. For example, a spring could be used to apply pressure to the active area.

In another embodiment, the stack comprises means for applying pressure to the active area, and separate means for applying pressure to the peripheral area. The means for applying pressure to the peripheral area may be the same type of means used to apply pressure to the active area, e.g. a hydrostatic pump. Alternatively, tie rods could be used to apply the pressure to the peripheral area. The key feature is that the means for applying pressure to the active area is decoupled from the means for applying pressure to the peripheral (gasket) area.

When a tie rod system is used to generate and sustain pressure on the peripheral area, the pressure acts preferably upon the gasket column, non-conductive (e.g. polymer) frame ring and the outer area of the membrane, to effect cross-cell sealing with possible differential pressure between the sides, and to ensure overall leak tightness. This embodiment is illustrated in FIG. 2.

When a hydrostatic pump is used to apply pressure to the active area, the piston ram is preferably fastened to a current feed-through, which is also preferably formed from highly conductive material.

In a preferred embodiment, the stack does not comprise the conventional end plate, tie rods and Belleville washers. In this embodiment, the peripheral pressure is applied separately from the active area pressure, and there are no conventional end plates. A skid arrangement may be employed, comprising an I-beam steel structure, accommodating two separate hydraulic circuits to fulfil the role of applying the peripheral pressure and the active area pressure decoupled. This embodiment is particularly desirable for scalability, and ease of assembly, since it breaks up the stack into several entities and moves the order decoupling point (separation between forecast driven and demand driven inventory techniques) to maximise the reactionary or demand-driven supply chain elements.

A secondary advantage lies in the ease of replacement of the working parts, whilst not requiring the complete removal and service of the parts which are less prone to damage over time. A third advantage is that the number of components is reduced dramatically.

There are further advantages to the means for applying pressure to the different areas (active and peripheral) being separately controllable. For example, during idle periods of the system, it may be beneficial to release the pressure on the active area, such that the membrane (which may be hydrophilic) is allowed to re-absorb water. This may improve the longevity of the system. Further, it has been shown (in the example) that power output of the cell may be controlled by varying pressure. It is advantageous and energy efficient to do this separately from the gasket pressure.

When the pressure of the active and peripheral areas are separated, there is also the possibility to jointly increase the pressure over the membrane material to strain the material, such that its structural integrity is not compromised.

In one embodiment, the region between manifolds and active are comprises a porous material, to allow good distribution of reactants and removal of products. In a preferred embodiment, a differential porosity system can be used between the two manifolds concerned, which can provide a small back-pressure, which leads to a more optimised mass transport within the cell. The porous materials may comprise metal sinter, polymer or ceramic. These sinters may be adapted so that they provide an additional benefit from managing actively the flows of reactants and water collection throughout the whole stack.

The hollow non-conductive frame ring may be a polymer. Preferably, it is made out of any low TOG (Total Organic Carbon), temperature-resistant engineering polymer. The non-conductive ring is uniquely cost-effective and lends itself to accurate moulding predictability due to the materials used and the fact that it is substantially two-dimensional.

The thin bipolar plate (conductive disc) is uniquely cost-effective due to the small quantity of material used, and again due to its two-dimensional shape.

In a preferred embodiment, the bipolar plate is of an appropriate deformable thickness, to allow the required movement from cell to cell. This provides a potentially new way to take out the assembly tolerances of membrane support structures, and a means to ensure even compression of each cell.

The peripheral area constituted by the non-conductive hollow frames give shock or vibration protection to the cell.

The skid-mounted end pressure system design comprises "I-beams" which are typically zinc-plated. The two separate hydraulic circuits (peripheral pressure and active area pressure) and piston actuated end plates are preferably powered by pressure booster devices working on compressed air.

EXAMPLE

Figure 1:
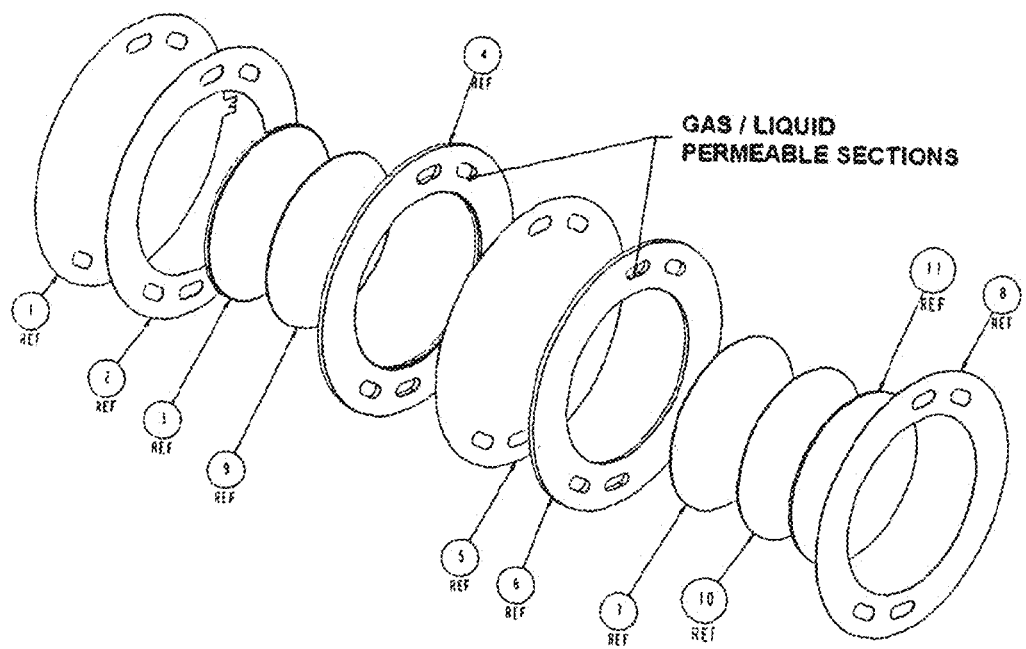
FIG. 1: Exploded Single Cell (Generic Design)
1. Titanium foil bi-polar plate
2. Polymer gasket
3. Electrode support
4. Cell frame
5. Membrane
6. Cell frame
7. Electrode
8. Polymer gasket
9. Electrode
10. Mesh
11. Electrode support
Figure 2:
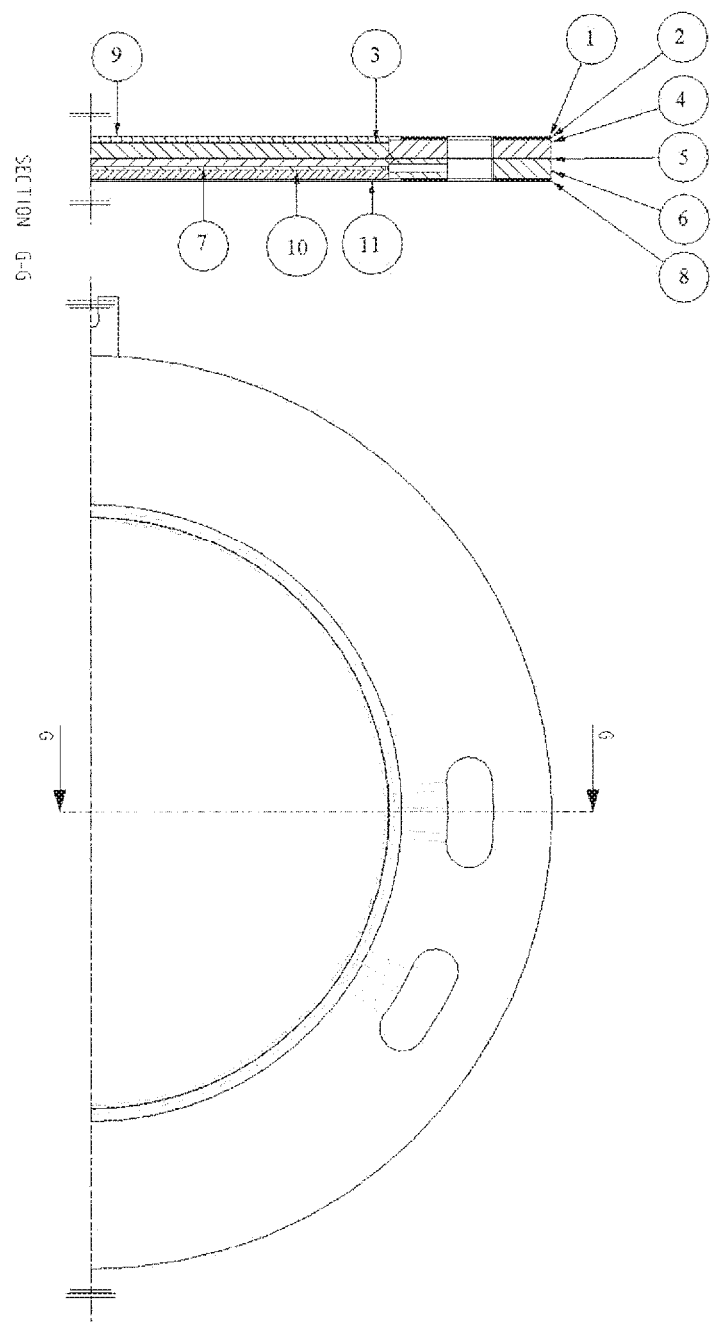
FIG. 2: Single cell cross drilled
1. Titanium foil bi-polar plate
2. Polymer gasket
3. Electrode support
4. Cell frame
5. Membrane
6. Cell frame
7. Electrode
8. Polymer gasket
9. Electrode
10. Mesh
11. Electrode support
Figure 3:
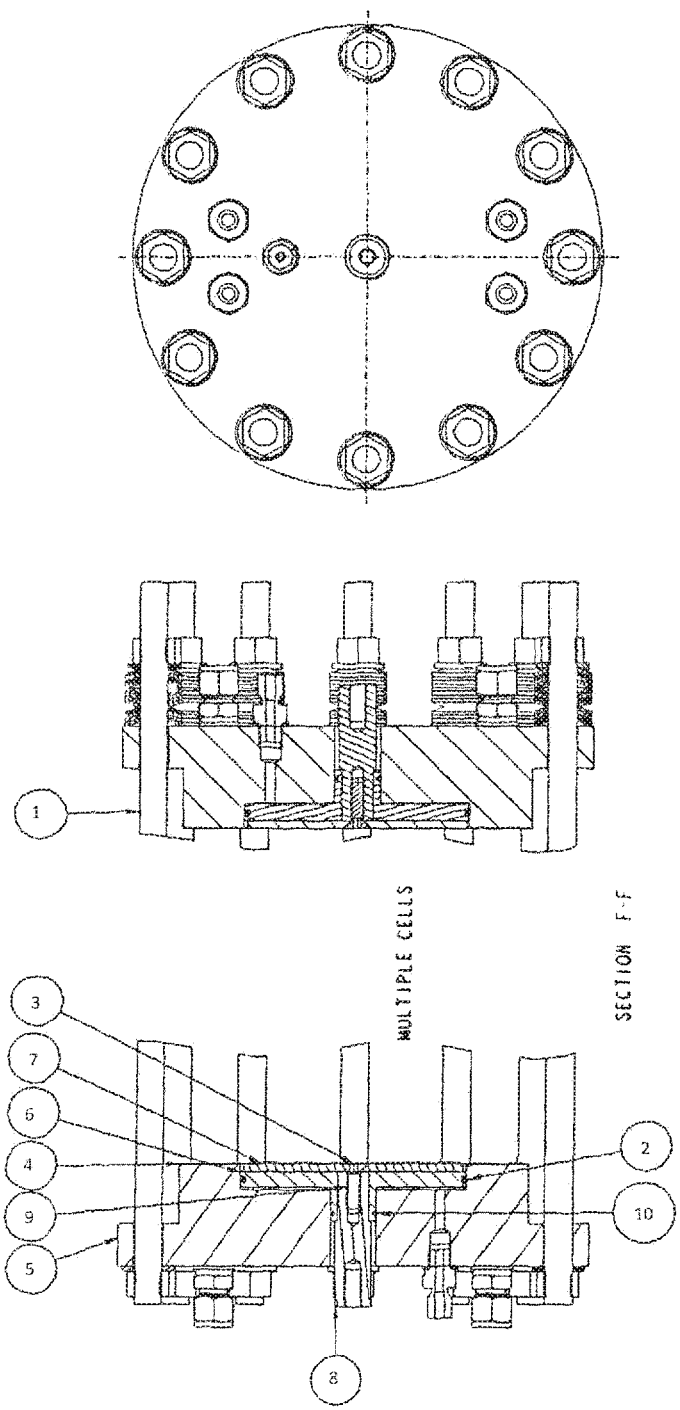
FIG. 3: Section through typical stack
1. Tie rod
2. O ring 3. Countersunk screw
4. Polymer gasket
5. End plate
6. Polymer Piston
7. Copper plate
8. Copper stem
9. Bipolar plate foil
10. O ring
Figure 4:
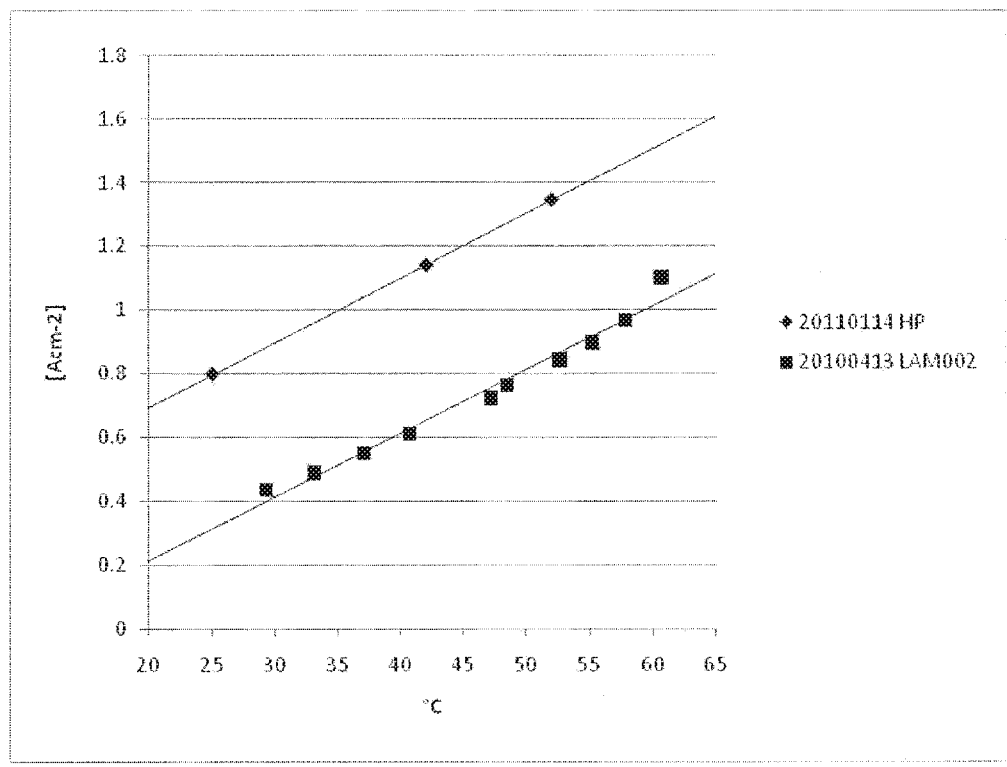
FIG. 4: Performance using high contact force and optimised electrodes
Figure 5:
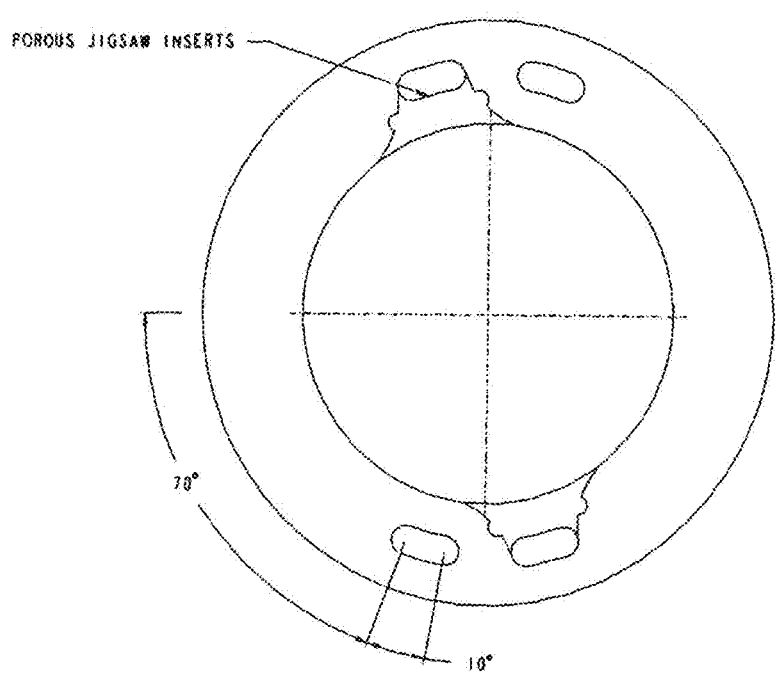
FIG. 5: Peripheral plate with porous inset
Figure 6:
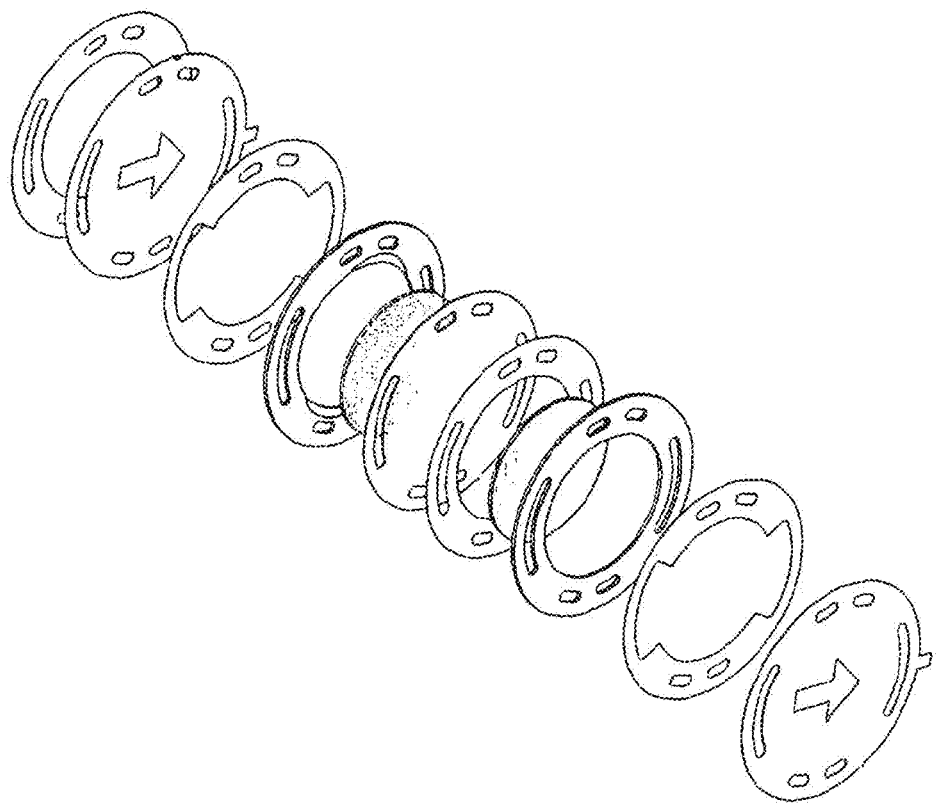
FIG. 6: Fuel cell embodiment

A high pressure stack embodiment was constructed according to the invention and was pressure tested and sealed in excess of 180 bar. FIG. 4 shows the performance attained using different electrodes and different piston pressure. FIG. 4 shows a significant increase in performance between the high pressure embodiment (2011 01 14 HP) with very high piston contact force and the lower pressure embodiment and its lower piston pressure (Lam002). The electrodes are also optimised in the case of the high pressure (2011 01 14 HP).

The higher the current ($A/cm^2$) in the cell, the more efficient the cell. Electrical efficiency gain is approximately 200 mV or 13.5%. This illustrates the advantage of having pressure applied to the active area of the cell.

What is claimed is:

1. A cell stack comprising an electrochemical cell, or a plurality of axially arranged electrochemical cells, with an end plate at each end of the stack, each cell comprising an active area surrounded by a peripheral area,
   wherein the active area comprises the membrane electrode assembly, and the peripheral area includes one or more channels for reactants,
   wherein the stack comprises means for applying pressure axially to the active area to contact the membrane and electrodes, and separate means for applying pressure axially to the peripheral area, and
   wherein the means for applying pressure axially to the active area is decoupled from the means for applying pressure axially to the peripheral area, such that pressure can be applied to the active area without applying pressure to the peripheral area and pressure can be applied to the peripheral area without applying pressure to the active area.

2. The cell stack according to claim 1, wherein the or each cell comprises an axial arrangement of a bipolar plate, a hollow gasket, a hollow peripheral plate enclosing the electrode, and an ion exchange membrane, wherein an outer region of the bipolar plate and the membrane, the gasket and the peripheral plate, form the peripheral area, and wherein an inner region of the membrane and the electrode, form the active area.

3. The cell stack according to claim 2, wherein the gasket is thermoplastic.

4. The cell stack according to claim 1, which is tubular.

5. The cell stack according to claim 1, wherein the means for applying pressure to the peripheral area is at least one axially arranged tie rod.

6. The cell stack according to claim 1, wherein the means for applying pressure to the active area and/or the means for applying pressure to the peripheral area is adjustable such that the amount of pressure that is applied can be controlled.

7. The cell stack according to claim 1, wherein the means for applying pressure to the active area and/or the means for applying pressure to the peripheral area is a piston.

8. The cell stack according to claim 1, wherein the means for applying pressure axially to the active area is configured to apply pressure uniformly over the active area.

9. A method of performing an electrochemical reaction in a cell comprising an active area surrounded by a peripheral area, wherein the active area includes the membrane electrode assembly and is the area where the cell reaction occurs, and the peripheral area includes one or more channels for reactants, the method comprising:
   applying pressure axially to the active area to contact the membrane and electrodes; and
   separately applying pressure axially to the peripheral area,
   wherein means for applying pressure axially to the active area is decoupled from means for applying pressure axially to the peripheral area, such that pressure can be applied to the active area without applying pressure to the peripheral area and pressure can be applied to the peripheral area without applying pressure to the active area.

10. The method according to claim 9, wherein pressure is varied during operation of the cell.

11. The method according to claim 9, wherein the pressure applied to the active area is uniform over the active area.

* * * * *